US012559076B2

(12) United States Patent
Lee et al.

(10) Patent No.: US 12,559,076 B2
(45) Date of Patent: Feb. 24, 2026

(54) APPARATUS AND METHOD OF COMPLEMENTING BRAKING FORCE OF COMMERCIAL VEHICLE

(71) Applicants: Hyundai Motor Company, Seoul (KR); Kia Corporation, Seoul (KR)

(72) Inventors: Joung-Ho Lee, Seongnam-si (KR); Nam Woo Lee, Hwaseong-si (KR); Gil Ho Kim, Chungcheongbuk-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 610 days.

(21) Appl. No.: 17/892,402

(22) Filed: Aug. 22, 2022

(65) Prior Publication Data

US 2023/0063325 A1 Mar. 2, 2023

(30) Foreign Application Priority Data

Sep. 1, 2021 (KR) ......................... 10-2021-0116064

(51) Int. Cl.
B60T 13/26 (2006.01)
B60T 13/68 (2006.01)
B60T 13/74 (2006.01)

(52) U.S. Cl.
CPC .......... B60T 13/268 (2013.01); B60T 13/683 (2013.01); B60T 13/74 (2013.01); *B60T 2260/06* (2013.01); *B60T 2270/60* (2013.01)

(58) Field of Classification Search
CPC .......... B60T 13/268; B60T 1/10; B60T 13/74; B60T 13/683; B60T 2260/06; B60T 2270/60; Y02T 90/40
See application file for complete search history.

(56) References Cited

U.S. PATENT DOCUMENTS

| | | | | |
|---|---|---|---|---|
| 10,046,746 B2 * | 8/2018 | Farres | ................... | B60T 17/221 |
| 2020/0233410 A1 * | 7/2020 | Burns | ..................... | B60L 50/66 |
| 2024/0400029 A1 * | 12/2024 | Lee | ....................... | B60T 17/004 |

FOREIGN PATENT DOCUMENTS

KR 100774351 B1 11/2007

OTHER PUBLICATIONS

Japanese Patent JP 4188417 published on Nov. 26, 2008.*
Korean Patent No. KR 20090040109 to Kim published on Apr. 23, 2009.*
Chinese Patent No. CN 102216134 to Headlee et al published on Oct. 12, 2011.*

* cited by examiner

*Primary Examiner* — Pamela Rodriguez
(74) *Attorney, Agent, or Firm* — Slater Matsil, LLP

(57) ABSTRACT

An embodiment apparatus for complementing a braking force of a vehicle includes a driving unit configured to drive an autonomous drone, a braking complement system connected with the driving unit and configured to complement the braking force, and a controller configured to determine a braking complement condition of the vehicle and to drive the braking complement system based on the braking complement condition. An embodiment braking complement system includes a compressor, wherein the driving unit is configured to apply an electric driving force to the compressor, an air tank in which compressed air discharged from the compressor is stored, and a braking complement unit connected with a discharge end of the air tank.

16 Claims, 5 Drawing Sheets

CONFIGURATION EXAMPLE OF BRAKING COMPLEMENT APPARATUS

CONFIGURATION EXAMPLE OF BRAKING COMPLEMENT APPARATUS

ELECTRICAL CONNECTION STRUCTURE

APPARATUS AND METHOD OF COMPLEMENTING BRAKING FORCE OF COMMERCIAL VEHICLE

CROSS-REFERENCE TO RELATED APPLICATIONS

This application claims the benefit of Korean Patent Application No. 10-2021-0116064, filed on Sep. 1, 2021, which application is hereby incorporated herein by reference.

TECHNICAL FIELD

The present disclosure relates to an apparatus and method of complementing a braking force of a commercial vehicle.

BACKGROUND

Generally, big commercial vehicles such as a bus, a truck, or a trailer are equipped with various pneumatic devices including an air brake that performs braking using a pressure of compressed air and an air opening/closing device that automatically opens/closes a door. The compressed air is provided to this pneumatic device after having been supplied to and stored in an air tank by a compressor operated by power of an engine. To this end, the compressed air in the air tank should be stored to maintain a proper pressure at all times.

The power of the engine is transmitted to a crank shaft in a crank case, which is installed in the engine, through a driving gear meshed with a timing gear. When the crank shaft is rotated, a piston in a pump chamber is moved together. Thus, the compressed air is supplied to the air tank through a discharge port of the compressor. When the compressed air is continuously supplied, a pressure in the air tank becomes higher than a set pressure. When some of the pressure is transmitted to an unloader through a governor as a signal pressure, the unloader is operated to interrupt the supply of the compressed air to the air tank, and thus the compressor runs idle. When the pressure in the air tank is lowered while being used, the unloader is reversely operated, and the compressed air is supplied to the air tank again.

Recently, in the case of the commercial vehicles equipped with the fuel cell system, there is a problem that a system maintaining the compressed air inside the air tank cannot be used through the engine. However, even if a rotating force of the engine is not applied, the compressor can be driven using electric energy. Thus, there is a need for a configuration to maintain a predetermined pressure of the compressed air in the air tank.

Furthermore, recently, a high-voltage battery and a regenerative braking system may be used along with the fuel cell system, and various driving transmission modes capable of driving a compressor of a braking complement system installed in the commercial vehicle including multiple driving units are required.

In addition, to cope with a problem that the compressor used in the fuel cell system and the compressor used in the braking complement system are separately configured, development of the braking complement system using one integrated compressor is required.

Korean Registered Patent No. 10-0774351 provides information related to the subject matter of the present disclosure.

SUMMARY

The present disclosure relates to an apparatus and method of complementing a braking force of a commercial vehicle.

Particular embodiments relate to an apparatus and method of complementing a braking force of a commercial vehicle that provide compressed air to a braking force complementing system in correspondence to conditions on which braking complement is required on the basis of one integrated compressor and drive the compressor using electric energy of a driving unit in correspondence to a request for the compressed air.

Embodiments of the present disclosure can solve problems associated with the related art. An embodiment of the present disclosure provides one integrated compressor that is energized with a fuel cell system, a high-voltage battery, and a regenerative braking system.

Moreover, another embodiment of the present disclosure provides an apparatus for complementing a braking force of a commercial vehicle, which includes multiple driving units that can drive a compressor according to a pressure in an air tank in which compressed air is stored.

Embodiments of the present disclosure are not limited to the above-described embodiments, and other embodiments of the present disclosure, which are not mentioned, can be understood by the following description and also will be apparently understood through the described embodiments of the present disclosure. Further, the embodiments of the present disclosure can be implemented by means described in the appended claims and a combination thereof.

In embodiments of the present disclosure, an apparatus and method of complementing a braking force of a commercial vehicle include the following configurations.

According to an embodiment of the present disclosure, an apparatus for complementing a braking force of a commercial vehicle includes a driving unit configured to drive an autonomous drone, a braking complement system connected with the driving unit and configured to complement a braking force, and a control unit configured to determine braking complement conditions of the vehicle, connected with the driving unit on the braking complement conditions of the vehicle, and configured to drive the braking complement system, wherein the braking complement system includes a compressor to which an electric driving force is applied from the driving unit, an air tank in which compressed air discharged from the compressor is stored, and a braking complement unit that is connected with a discharge end of the air tank.

Here, the driving unit may include a fuel cell system which provides a driving force to the autonomous drone, a regenerative braking system that converts a braking force of the autonomous drone into electric energy, and a high-voltage battery that is chargeable from the fuel cell system or the regenerative braking system.

Moreover, the apparatus for complementing a braking force of a commercial vehicle may further include a bypass valve that is disposed at a discharge end of the compressor and selectively connects the braking complement unit and the driving unit.

Moreover, the apparatus for complementing a braking force of a commercial vehicle may further include an exhaust system of the fuel cell system which is connected with the bypass valve.

Moreover, the fuel cell system further may include a regulator that is disposed at a discharge end of the bypass valve, a cooler that is connected to a discharge end of the regulator, and a fuel cell stack that is connected between a discharge end of the cooler and the exhaust system.

Moreover, the air tank is made up of a braking air tank that is connected with a braking unit assisting a braking force of the vehicle and a suspension air tank that is connected with an air suspension.

Moreover, the control unit may be configured such that, when the braking complement conditions are satisfied, the air discharged from the compressor flows into the suspension air tank and brings a tire into contact with the ground.

Moreover, the control unit may be configured such that, when the braking complement conditions are satisfied, the air discharged from the compressor drives the braking unit through the braking air tank.

Moreover, the braking complement conditions may include a case in which a vehicle travels downward on a ramp or a case in which a live load is greater than a first reference value.

Moreover, the control unit may be configured to receive a pressure of the air tank of the braking complement unit and to drive the compressor through the driving unit when the received pressure is smaller than a second reference value.

According to another embodiment of the present disclosure, a method of complementing a braking force of a commercial vehicle includes the steps of determining whether there are braking complement conditions of the vehicle, driving an air suspension to control a tire to come into contact with the ground when the braking complement conditions of the vehicle are satisfied, determining whether a pressure of an air tank of a braking complement system is smaller than a reference pressure, and driving a compressor of the braking complement system through a driving unit when the pressure of the air tank of the braking complement system is smaller than a reference pressure.

Here, the method of complementing a braking force of a commercial vehicle may further include, when the pressure of the air tank of the braking complement system is greater than a reference pressure, by a control unit, calculating a flow rate of compressed air required of the braking complement system, controlling a driving amount of a compressor and an opening amount of a bypass valve in correspondence to the calculated flow rate to close a discharge port adjacent to the air tank, and controlling the opening amount of the bypass valve to supply compressed air flowing into a fuel cell stack from the compressor.

Moreover, the step of driving the compressor of the braking complement system through the driving unit may include determining whether a fuel cell system is in a stopped state, determining whether a state of charge (SOC) of a high-voltage battery is greater than a minimum reference value when it is determined that the fuel cell system is in the stopped state, and driving the compressor through the high-voltage battery when it is determined that the SOC of the high-voltage battery is greater than a minimum reference value.

Moreover, the step of determining that the SOC of the high-voltage battery is smaller than a minimum reference value may include driving the fuel cell system and driving the compressor through the fuel cell system.

Moreover, the step of determining that the fuel cell system is not in a stopped state may include determining whether the SOC of the high-voltage battery is smaller than a maximum reference value, and the step of determining that the SOC of the high-voltage battery is smaller than a maximum reference value may include driving the compressor through the fuel cell system.

Moreover, when it is determined that the fuel cell system is not in a stopped state, the step of determining whether the SOC of the high-voltage battery is smaller than a maximum reference value may include determining whether braking of the vehicle is applied when it is determined that the SOC of the high-voltage battery is greater than a maximum reference value and driving the compressor through a regenerative braking system when it is determined that the braking of the vehicle is applied.

Moreover, the step of determining whether the braking of the vehicle is applied may include driving the compressor through a high-voltage battery when it is determined that the braking of the vehicle is not applied.

In addition, the driving unit may include at least one of a fuel cell system, a high-voltage battery, and a regenerative braking system.

Embodiments of the present disclosure can obtain the following effects from the above configurations, combinations, and use relationships to be described below.

A fuel cell system and a braking complement unit can be driven by one integrated compressor, and thus the number of components can be reduced.

In addition, multiple driving units are provided to be able to selectively drive the integrated compressor in correspondence to a condition on which a high braking force is required, and thus driving efficiency of the compressor can be increased.

BRIEF DESCRIPTION OF THE DRAWINGS

The above and other features of embodiments of the present disclosure will now be described in detail with reference to certain exemplary embodiments thereof illustrated in the accompanying drawings which are given hereinbelow by way of illustration only, and thus are not limitative of the present disclosure, and wherein.

DETAILED DESCRIPTION OF ILLUSTRATIVE EMBODIMENTS

Figure 1:
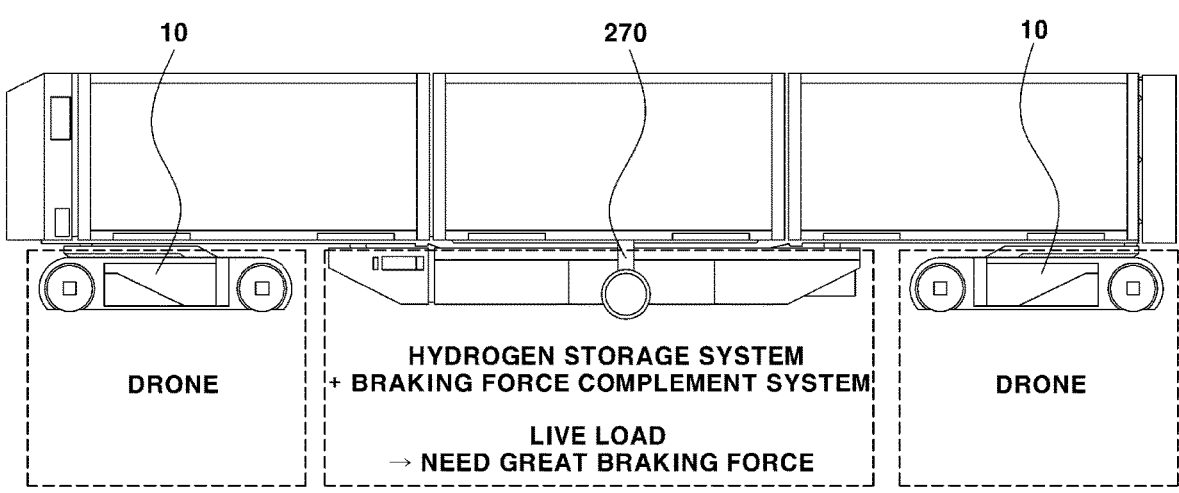
FIG. 1 is a configuration diagram illustrating an apparatus for complementing a braking force of a commercial vehicle, as an embodiment of the present disclosure.

Hereinafter, embodiments of the present disclosure will be described in detail with reference to the accompanying drawings. The embodiments of the present disclosure can be modified in various forms, and the scope of the present disclosure should not be interpreted as being limited to the following embodiments. The present embodiments are provided to those having ordinary skill in the art in order to more completely describe the present disclosure.

In addition, the terms " . . . section," " . . . unit," " . . . system," etc. used herein refer to a unit that processes at least one function or operation, which can be embodied as hardware, software, or a combination thereof.

Hereinafter, the embodiments will be described in detail with reference to the accompanying drawings. In describing the embodiments with reference to the accompanying drawings, identical or corresponding components are given identical reference numerals, and duplicate description thereof will be omitted.

The present disclosure relates to an apparatus and method of complementing a braking force of a commercial vehicle. In an embodiment commercial vehicle that complements a braking force using compressed air, a structure for driving a compressor 210 providing compressed air and a structure for transmitting electric energy applied to the compressor 210 are provided.

More preferably, the commercial vehicle of embodiments of the present disclosure may be divided into a drone 10 for applying a driving force of the vehicle and a loading box in which a loading object can be located, and a braking complement system 200 includes a braking unit 250 for performing braking complement and an air suspension 270 configured to be fastened to the loading box and to be able to perform movement of a tire in a height direction.

The braking unit 250 may be configured independently of wheels located at the air suspension 270 or be provided on wheels located at the drone 10.

The braking unit 250 may include all braking modes that can provide a pneumatic pressure to a friction brake along with or independently of a hydraulic pressure, and may further include a type of brake that reduces a speed using an air resistance force as an air brake.

Figure 2:
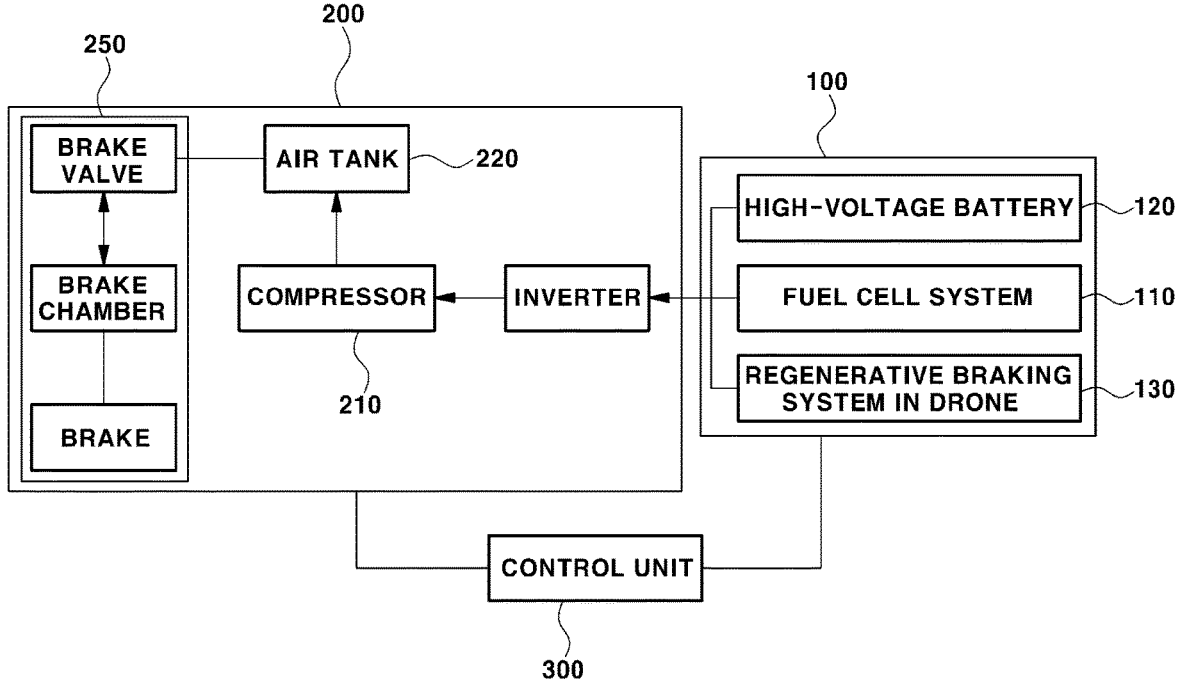
FIG. 2 is a block diagram illustrating an apparatus for complementing a braking force of a commercial vehicle, as an embodiment of the present disclosure.

FIGS. 1 and 2 are a side diagram and a block diagram illustrating a structure of an apparatus for complementing a braking force of a commercial vehicle, as an embodiment of the present disclosure.

The embodiment of the present disclosure provides the integrated compressor 210 coupled with a driving unit 100. The compressor 210 includes the braking complement system 200 which is supplied with electric energy from the driving unit 100, injects compressed air into an air tank 220, and is configured to inject the compressed air into a braking complement unit when traveling complement conditions are satisfied depending on determination of a control unit 300.

Figure 3A:
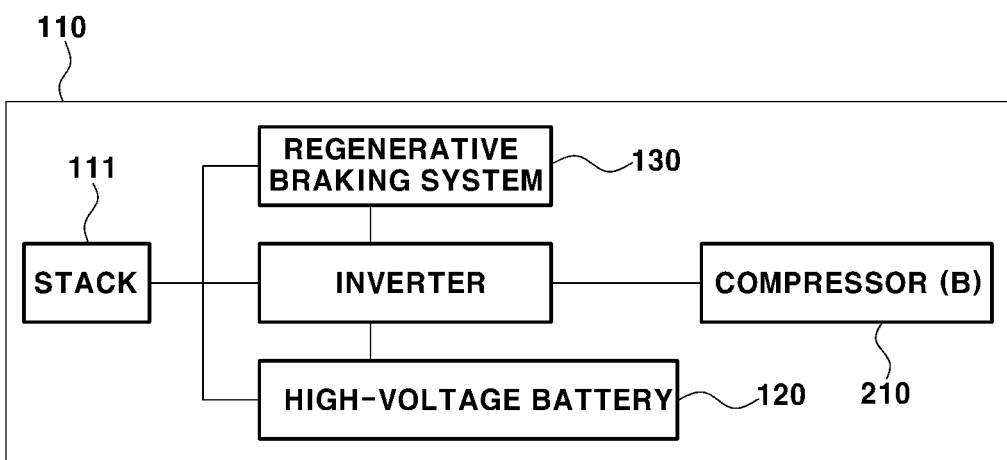
FIG. 3A illustrates an electrical connection structure of an apparatus for complementing a braking force of a commercial vehicle, as an embodiment of the present disclosure.
Figure 3B:
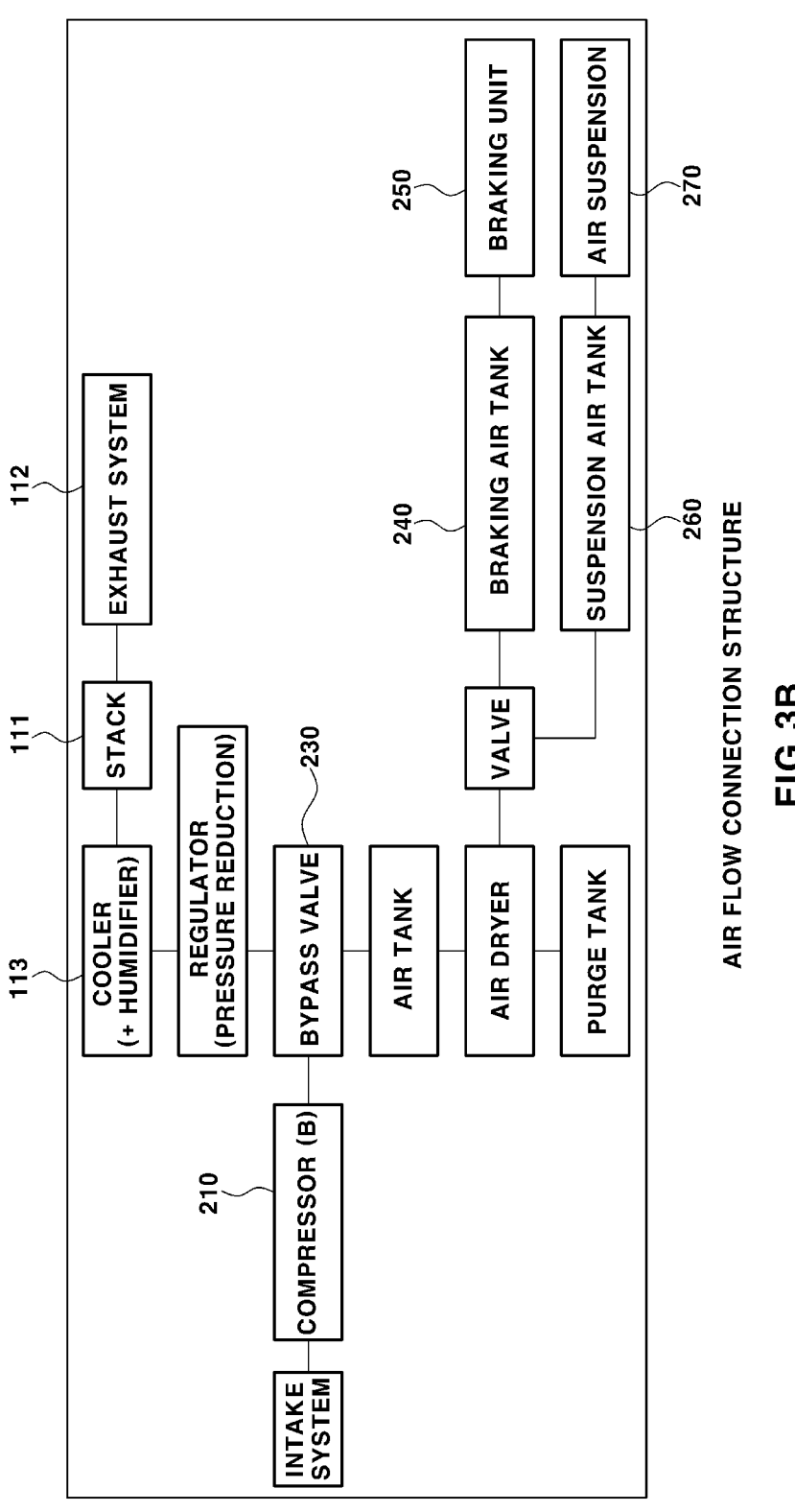
FIG. 3B illustrates an apparatus for complementing a braking force of a commercial vehicle according to a flow of air, as an embodiment of the present disclosure.

As shown in FIGS. 3A and 3B, a fuel cell system 110, which is one component of the driving unit 100 of embodiments of the present disclosure, is made up of a fuel cell stack 111, a compressor 210 that compresses air and supplies the compressed air to a cathode of the fuel cell stack 111, and an exhaust system 112 that includes a back pressure regulating valve installed on a line to which air after a reaction at the fuel cell stack 111 is discharged.

Furthermore, an inflow end at which air flows into the fuel cell stack 111 through the compressor 210 may include a regulator for reducing a pressure of the compressed air, and a cooler 113 that can control an amount and temperature of moisture included in the inflow air.

The control unit 300 may set a flow rate of the air supplied to the fuel cell stack 111, and control driving of the compressor 210 and an opening amount of a bypass valve 230 on the basis of a currently supplied air pressure and an air demand amount of the compressor 210 in correspondence to the set flow rate of air.

The bypass valve 230 is located at a discharge end of the compressor 210, and may be controlled for fluid connection with the fuel cell system 110 and the braking complement system 200 at the same time or at different times.

In addition, a flow-rate sensor and a pressure sensor that detect a flow rate and a pressure of the air supplied from the compressor 210 subjected to fluid connection with the fuel cell stack 111 according to an embodiment of the present invention may be further included.

A high-voltage battery 120, which is another component of the driving unit 100 of embodiments of the present disclosure, may be coupled with the fuel cell stack 111 and be supplied with electric energy from the fuel cell stack 111. Moreover, the high-voltage battery 120 may be energized with a regenerative braking system 130 of the drone 10. Accordingly, the high-voltage battery 120 may be selectively charged through the fuel cell stack 111 or the regenerative braking system 130.

That is, the driving unit 100 of embodiments of the present disclosure means a configuration capable of generating electric energy, and includes the fuel cell system 110, the high-voltage battery 120, and the regenerative braking system 130. Also, the driving unit 100 may be configured to be individually energized with the compressor 210 through an inverter 140. Furthermore, the driving unit 100 is configured to apply a driving force of the integrated compressor 210. When a reference pressure of the air tank 220 subjected to fluid connection with the compressor 210 is smaller than a second reference value, the control unit 300 is controlled to operate the compressor 210 through the driving unit 100.

The control unit 300 may be configured to measure a load of the loading object which is applied to the loading box and to receive a traveling environment of the vehicle. More preferably, the control unit 300 may receive a gradient of traveling depending on a traveling path of the drone 10, and a live load measured from the load sensor located at the loading box. The control unit 300 is configured to determine whether to satisfy braking complement conditions on the basis of this received data, wherein it is determined that the braking complement conditions are satisfied when the vehicle is in a downward traveling state on a ramp or when the live load is greater than a first reference value.

When the braking complement conditions are satisfied, the control unit 300 is configured to supply compressed air from the air tank 220 including the compressed air to the braking complement unit. That is, the control unit 300 is configured such that the compressed air is injected into at least one of a braking air tank 240 and a suspension air tank 260 constituting the braking complement unit.

The braking air tank 240 may provide the compressed air to the braking unit 250 that assists a braking force of the vehicle, and the air suspension 270 is downwardly expanded by the compressed air flowing into the suspension air tank 260 such that a tire comes into contact with the ground. More preferably, the tire coupled with the air suspension 270 is configured to enable expansion or suspension in correspondence to the live load. When the live load is greater than the first reference value, the air suspension 270 is expanded such that the tire comes into contact with the ground to distribute an axial load. When the live load is smaller than the first reference value, the air suspension 270 may be suspended such that the tire is separated from the ground in order to reduce resistance generated during traveling.

As illustrated in FIG. 2, a structure of the braking unit 250 is illustrated as the braking complement system 200. Electric energy applied through the driving unit 100 drives the compressor 210 via the inverter 140, and the air tank 220 located at the discharge end of the driven compressor 210 is configured such that the compressed air is maintained above a predetermined pressure. The compressed air inside the air tank 220 is transmitted to a brake valve at the time of braking, and provides a braking force of a brake via a brake chamber.

In FIG. 3A, the driving unit 100 including an electrical connection structure having the integrated compressor 210 is illustrated. In FIG. 3B, a configuration of the apparatus for complementing a braking force of a commercial vehicle according to a flow of air is illustrated.

In FIG. 3A, the compressor 210 may be electrically connected such that the electric energy generated from the fuel cell stack 111 is applied to the compressor 210 through the inverter 140. Also, the high-voltage battery 120 may be energized with a rear end of the fuel cell stack 111 such that the electric energy generated from the fuel cell stack 111 can be stored. That is, the fuel cell stack 111 or the high-voltage battery 120 is configured to enable the electric energy to be applied to the compressor 210 through the inverter 140.

More preferably, in addition to the fuel cell stack 111 and the high-voltage battery 120, a front end of the inverter 140 may be connected with the regenerative braking system 130 located at the braking unit 250 of the vehicle, and electric energy generated by conducting regenerative braking may be provided to the compressor 210.

Moreover, the apparatus for complementing a braking force of a commercial vehicle, connected depending on a flow of air, is illustrated in FIG. 3B. The compressor 210 of the braking complement system 200 of embodiments of the present disclosure is configured as the compressor 210 of the fuel cell system 110 so as to be used integrally with the braking complement system 200 and the fuel cell system 110. That is, the compressor 210 connected with the intake system is configured to be coupled with the bypass valve 230 at the discharge end thereof such that air, which flows into the fuel cell stack 111 through a regulator 114 and a cooler 113 constituting the fuel cell system 110 and then through the exhaust system 112, is discharged.

The bypass valve 230 may be configured to be fluid-connected with the exhaust system 112 of the fuel cell system and the braking complement unit at the same time or selectively. Furthermore, the braking complement unit may be configured to be fluid-connected with the braking air tank 240 and the suspension air tank 260 past the air tank 220 through an air dryer 214 at the same time or selectively.

Furthermore, a valve 216 is disposed between the air dryer 214 and the braking air tank 240 and the suspension air tank 260, and may be controlled such that the compressed air is injected into the braking air tank 240 and the suspension air tank 260. And the air dryer 214 may be communicated with the purge tank 218.

In this way, the integrated compressor 210 of embodiments of the present disclosure may be electrically connected with the fuel cell system 110, the high-voltage battery 120, and the regenerative braking system 130 that constitute the driving unit 100, and the control unit 300 is configured to drive the compressor 210 through at least one of the components of the driving unit 100 when a pressure of the air tank 220 connected with the compressor 210 is smaller than the second reference value.

Aside from this, in the aspect of the flow of air, the compressor 210 may be configured such that the air flowing in through the intake system flows to the exhaust system 112 of the fuel cell system 110 or the braking complement unit through the bypass valve 230. Furthermore, the control unit 300 may apply the electric energy of the driving unit 100 to the compressor 210 in correspondence to pressure conditions of the air tank 220 of the braking complement system 200, and sufficiently maintain a flow rate of the compressed air in the air tank 220.

When the pressure in the air tank 220 is greater than the second reference value (the reference pressure), the control unit 300 is controlled to calculate a flow rate of the compressed air required in driving the fuel cell system 110, drive the compressor 210 in correspondence to the calculated flow rate, close a discharge port of the bypass valve 230 which is adjacent to the air tank 220, and increase an opening amount of the discharge port connected with the exhaust system 112.

In contrast, when the pressure in the air tank 220 is smaller than the second reference value (the reference pressure), the compressor 210 is driven through the driving unit 100, and thus the control unit 300 is controlled to calculate a flow rate of the compressed air required of the fuel cell stack 111 and the air tank 220, perform a reaction of the fuel cell stack 111 in correspondence to the calculated flow rate, drive the compressor 210, and increase an opening amount of the discharge port of the bypass valve 230 which is adjacent to the air tank 220.

Furthermore, the control unit 300 is controlled to calculate an amount of electric energy for driving the compressor 210 and to selectively drive the driving unit 100 connected to the compressor 210. That is, the control unit 300 determines whether the fuel cell system 110 is in a stopped state in a step in which the driving of the compressor 210 is required. When it is determined that the fuel cell system 110 is in a stopped state, the control unit 300 determines whether a state of charge (SOC) of the high-voltage battery 120 is greater than a minimum reference value. When the SOC of the high-voltage battery 120 is greater than a minimum reference value, the control unit 300 drives the compressor 210 through the high-voltage battery 120.

However, when the fuel cell system 110 is not in a stopped state and when the SOC of the high-voltage battery 120 is smaller than a maximum reference value, the control unit 300 is controlled such that electric energy is applied to the compressor 210 through the fuel cell system 110.

Moreover, when the fuel cell system 110 is not in a stopped state and when the SOC of the high-voltage battery 120 is greater than a maximum reference value, the control unit 300 determines whether or not to apply braking to a vehicle. When it is determined that braking is applied to a vehicle, the control unit 300 provides electric energy to the compressor 210 through the regenerative braking system 130. That is, when additional charge of the high-voltage battery 120 is impossible, the control unit 300 is configured to drive the compressor 210 of the braking complement system 200 using surplus electric energy of the regenerative braking system 130. In a state in which braking is not applied to a vehicle even when the SOC of the high-voltage battery 120 is greater than a maximum reference value, the control unit 300 is configured to drive the compressor 210 through the high-voltage battery 120.

As described above, the control unit 300 of embodiments of the present disclosure is controlled to selectively distribute the compressed air inside the air tank 220 to the exhaust system 112 of the fuel cell system 110 or the braking complement unit through the bypass valve 230 in correspondence to the braking complement conditions, and to transmit electric energy to the compressor 210 through at least one of the components of the driving unit 100 so as to drive the compressor 210 in correspondence to a pressure of the compressed air inside the air tank 220.

Figure 4:
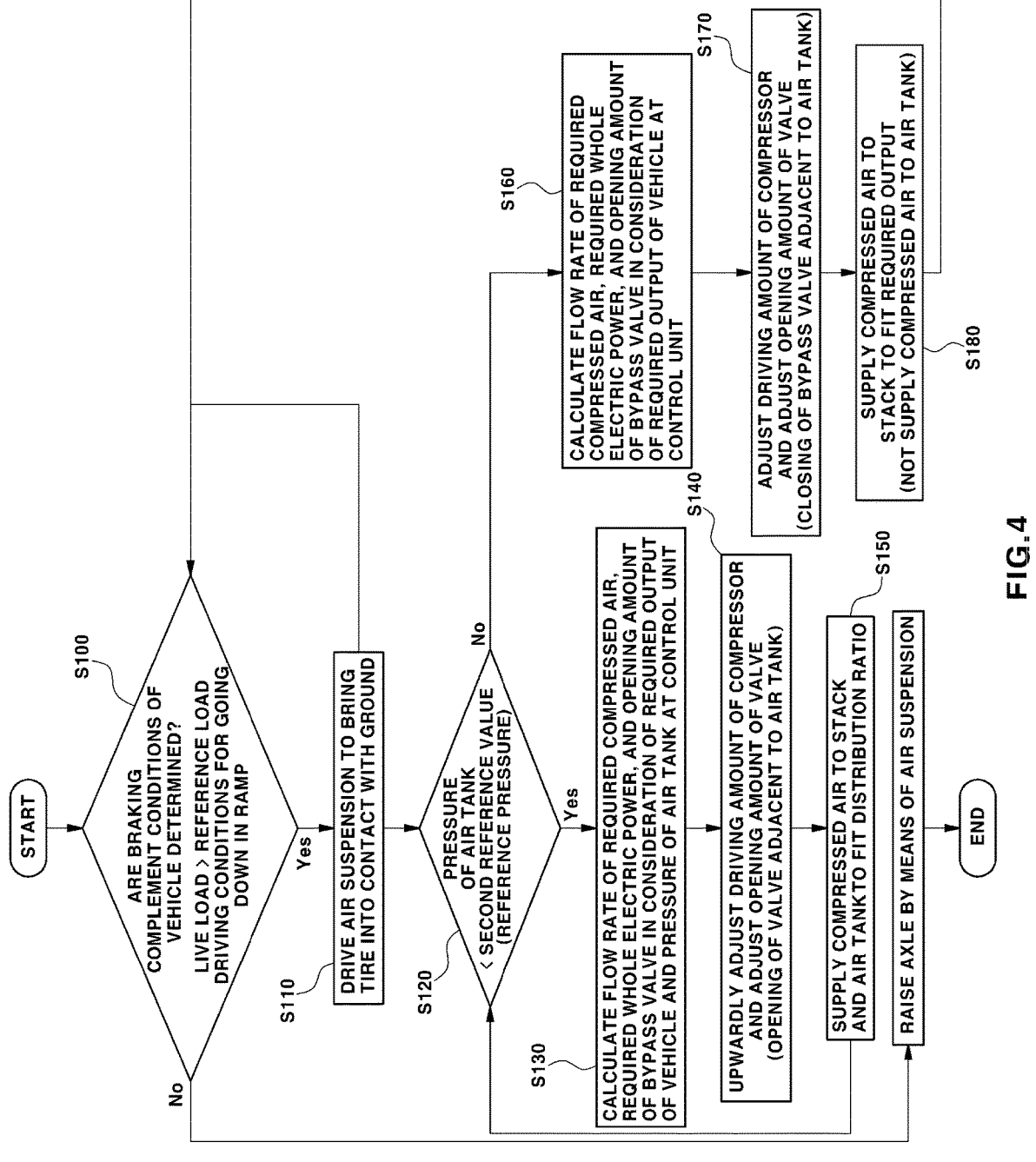
FIG. 4 is a flow chart illustrating how to drive a braking complement unit in a method of complementing a braking force of a commercial vehicle, as an embodiment of the present disclosure.

FIG. 4 is a control flow chart of compressed air in a method of complementing a braking force of a commercial vehicle, as an embodiment of the present disclosure.

A method of complementing a braking force of a commercial vehicle of embodiments of the present disclosure is a method of controlling a flow of compressed air applied to the air tank 220 from the compressor 210, and includes determining braking complement conditions of a vehicle (S100). The case of the braking complement conditions of the vehicle includes a case in which a load of a loading object loaded in a loading box is greater than a first reference value or a case determined as downward traveling on a ramp. However, when the braking complement conditions of the vehicle are not satisfied, the control unit 300 is configured to drive the vehicle with the air suspension 270 suspended (S190).

When the braking complement conditions of the vehicle are satisfied, the control unit 300 is controlled to allow compressed air existing in the air tank 220 to flow into the suspension air tank 260, and is configured such that the air suspension 270 is expanded by the compressed air flowing into the suspension air tank 260. Accordingly, a tire located at a lower end of the air suspension 270 is configured to come into contact with the ground (S110).

Afterwards, it is determined whether a pressure of the compressed air remaining in the air tank 220 is smaller than a second reference value (a reference pressure) (S120). When a pressure of the air tank 220 is smaller than a reference pressure, the control unit 300 calculates a flow rate of the compressed air discharged through the compressor 210 in overall consideration of a flow rate of the compressed air supplied to the air tank 220 and a flow rate of the compressed air according to driving of the fuel cell system 110. Moreover, the control unit 300 sets an opening amount of the bypass valve 230 such that the compressed air discharged from the compressor 210 can flow into the fuel cell system 110 and the air tank 220 (S130). Afterwards, in correspondence to the flow rate of the compressed air which is calculated by the control unit 300, a driving RPM of the compressor 210 is adjusted upward, and the opening amount of the bypass valve 230 is controlled (S140). Thereby, the compressed air corresponding to the calculated flow rate is configured to flow into the fuel cell stack 111 and the air tank 220 (S150).

On the other hand, afterwards, in step S120 of determining whether a pressure of the compressed air remaining in the air tank 220 is smaller than a second reference value (a reference pressure), when a pressure of the air tank 220 is not less than a reference pressure, the control unit 300 is configured to calculate a flow rate of the compressed air required of the discharge end of the compressor 210 in consideration of driving conditions of the vehicle (S160). The control unit 300 is configured to drive the compressor 210 in correspondence to the calculated flow rate of the required compressed air, and additionally close the discharge end of the bypass valve 230 subjected to fluid connection with the air tank 220 (S170). Afterwards, the compressed air discharged to the discharge end of the compressor 210 is controlled to be supplied to the fuel cell stack 111 in the fuel cell system 110 (S180).

As described above, embodiments of the present disclosure provide technology, as the braking force complementing method, for determining whether to satisfy the braking complement conditions of the vehicle, calculating the flow rate of the compressed air in consideration of the pressure of the air tank 220, and controlling a driving amount of the compressor 210 and an opening amount of the bypass valve 230. That is, control corresponding to the flow rate of the compressed air is performed.

Figure 5:
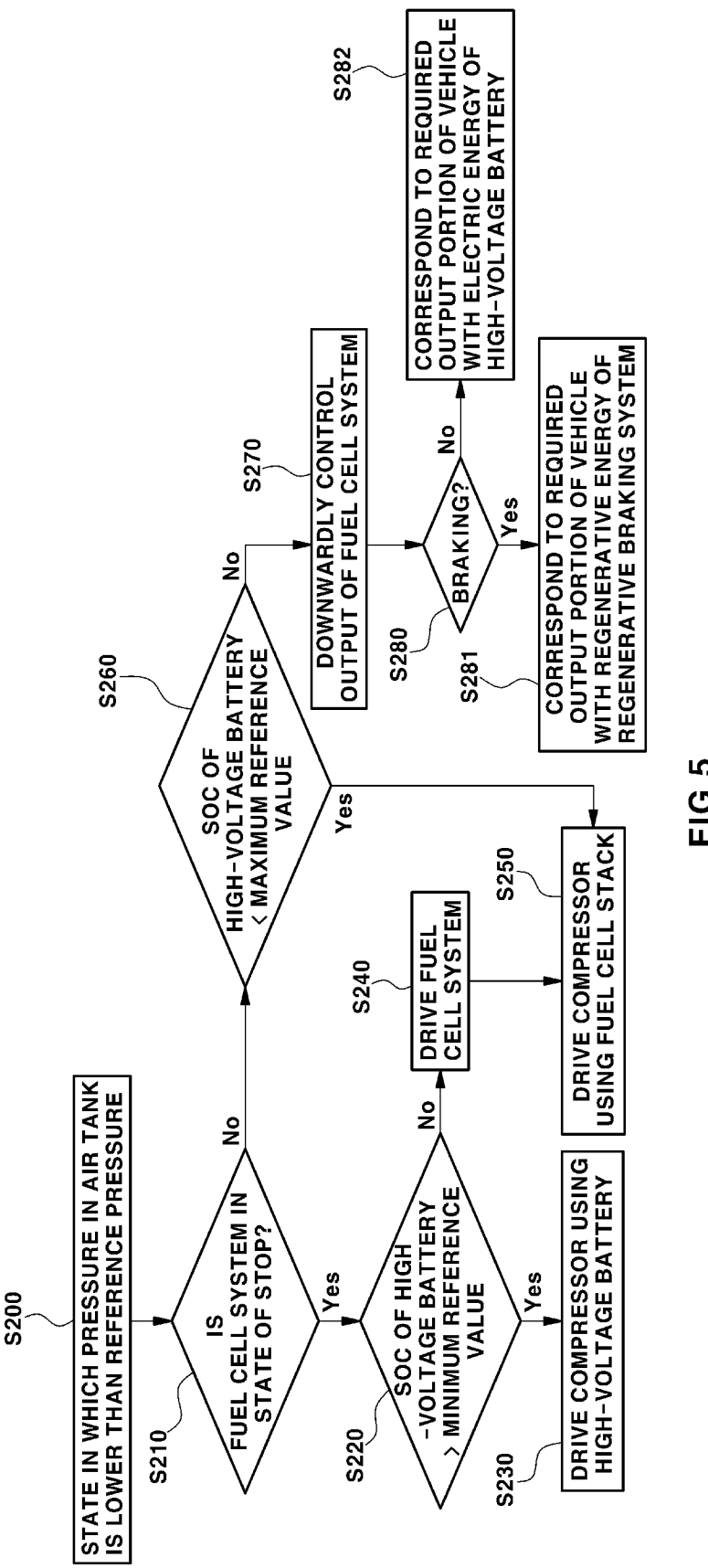
FIG. 5 is a flow chart illustrating how to drive a compressor in a method of complementing a braking force of a commercial vehicle, as an embodiment of the present disclosure.

FIG. 5 is a control flow chart illustrating how to transmit an electric driving force to the compressor 210 in a method of complementing a braking force of a commercial vehicle, as an embodiment of the present disclosure.

To upward control a rotating force of the compressor 210, electric energy is transmitted from the driving unit 100 to the compressor 210. It is determined first that a pressure of the compressed air in the air tank 220 is smaller than a second reference value (a reference pressure) (S200).

Afterwards, it is determined whether the fuel cell system 110 is in a stopped state (S210). When the fuel cell system 110 is in a stopped state, the stopped state being a state in which electric energy cannot be applied to the compressor 210 from the fuel cell stack 111, it is determined whether the SOC of the high-voltage battery 120 is greater than a set minimum reference value (S220). In the state in which the SOC of the high-voltage battery 120 is greater than a minimum reference value, the electric energy of the high-voltage battery 120 is applied to drive the compressor 210 (S230).

On the other hand, in a state in which the SOC of the high-voltage battery 120 is not greater than a minimum reference value, the fuel cell system 110 is driven (S240), and the compressor 210 is driven using electric energy generated by a reaction of the fuel cell stack 111 (S250).

However, when the fuel cell system 110 is not in a stopped state in the beginning (S210), it is determined whether the SOC of the high-voltage battery 120 is smaller than a maximum reference value (S260). When the SOC of the high-voltage battery 120 is smaller than a maximum reference value, the fuel cell system 110 is driven (S240) to apply electric energy to the compressor 210 from the fuel cell stack 111 (S250). Moreover, when the SOC of the high-voltage battery 120 is not less than a maximum reference value, output generated from the fuel cell system 110 is controlled downward (S270), and it is determined whether or not the downwardly controlled output is performing braking of the vehicle as an operation condition of the regenerative braking system 130 of the vehicle (S280). When braking of the vehicle is performed, the compressor 210 is driven by electric energy generated through the regenerative braking system 130 (S281). When braking of the vehicle is not performed, electric energy from the high-voltage battery 120 is controlled to be applied to the compressor 210 (S282).

That is, embodiments of the present disclosure provide the method of complementing a braking force of a commercial vehicle, which is configured to determine driving of the fuel cell system 110 first, and then perform electric driving connection of the compressor 210 in consideration of the SOC of the high-voltage battery 120, and to be able to apply the electric energy of the compressor 210 through the regenerative braking system 130 in consideration of the braking conditions of the vehicle when the SOC of the high-voltage battery 120 is smaller than a maximum reference value.

The above detailed description is to illustrate embodiments of the present disclosure. Moreover, the above-described contents are to represent and describe exemplary embodiments of the present disclosure, and the present disclosure may be used in various other combinations, modifications, and environments. That is, the present disclosure can be modified or corrected without departing from the subject matter of the disclosure disclosed herein, an equivalent range to the disclosed contents, and/or a range of the technology or knowledge in the art. The described embodiments are to describe the best mode for implementing the technical spirit of the present disclosure, and various modifications required in a specific application field and use of the present disclosure are possible. Accordingly, the above detailed description is not intended to restrict the present disclosure by the disclosed embodiments. In addition, the attached claims should be interpreted as including other embodiments.

What is claimed is:

1. An apparatus for complementing a braking force of a vehicle, the apparatus comprising:
  a driving unit configured to drive an autonomous drone;
  a braking complement system connected with the driving unit and configured to complement the braking force, wherein the braking complement system comprises:
    a compressor, wherein the driving unit is configured to apply an electric driving force to the compressor;
    an air tank in which compressed air discharged from the compressor is stored; and
    a braking complement unit connected with a discharge end of the air tank;
  a controller configured to determine a braking complement condition of the vehicle and to drive the braking complement system based on the braking complement condition; and
  a bypass valve disposed at a discharge end of the compressor and configured to be controlled for fluid connection with both a fuel cell system and the braking complement unit at the same time or at different times.

2. The apparatus according to claim 1, wherein the driving unit comprises:
  the fuel cell system configured to provide a driving force to the autonomous drone;
  a regenerative braking system configured to convert a braking force of the autonomous drone into electric energy; and
  a high-voltage battery configured to be charged from the fuel cell system or the regenerative braking system.

3. The apparatus according to claim 1, wherein the fuel cell system further comprises an exhaust system.

4. The apparatus according to claim 3, wherein the fuel cell system further comprises: a regulator disposed at a discharge end of the bypass valve;
  a cooler connected to a discharge end of the regulator; and
  a fuel cell stack connected between a discharge end of the cooler and the exhaust system.

5. The apparatus according to claim 1, wherein the air tank comprises:
  a braking air tank connected to a braking unit configured to assist the braking force of the vehicle; and
  a suspension air tank connected to an air suspension.

6. The apparatus according to claim 5, wherein the controller is configured to cause the compressed air discharged from the compressor to flow into the suspension air tank and bring a tire into contact with a ground surface in response to the braking complement condition being satisfied.

7. The apparatus according to claim 5, wherein the controller is configured to cause the compressed air discharged from the compressor to drive the braking unit through the braking air tank in response to the braking complement condition being satisfied.

8. The apparatus according to claim 1, wherein the braking complement condition comprises downward traveling of the vehicle on a ramp.

9. The apparatus according to claim 1, wherein the braking complement condition comprises a case in which a live load is greater than a first reference value.

10. The apparatus according to claim 1, wherein the controller is configured to receive a pressure of the air tank of the braking complement unit and to drive the compressor through the driving unit in response to the received pressure being smaller than a second reference value.

11. An apparatus comprising:
  a driving unit configured to drive an autonomous drone;
  a braking system connected with the driving unit and configured to complement a braking force, the braking system comprising:
    a compressor configured to discharge compressed air, wherein the driving unit is configured to apply an electric driving force to the compressor;
    an air tank configured to store the compressed air; and
    a braking complement unit connected with a discharge end of the air tank;
  a bypass valve disposed at a discharge end of the compressor; and
  a controller configured to determine a braking complement condition of a vehicle and to drive the braking system based on the braking complement condition,
  wherein the driving unit comprises:
    a fuel cell system configured to provide a driving force to the autonomous drone,
    a regenerative braking system configured to convert a braking force of the autonomous drone into electric energy, and
    a high-voltage battery configured to be charged from the fuel cell system or the regenerative braking system, and
  wherein the fuel cell system comprises:
    an exhaust system,
    a regulator disposed at a discharge end of the bypass valve,
    a cooler connected to a discharge end of the regulator, and
    a fuel cell stack connected between a discharge end of the cooler and the exhaust system.

12. An apparatus comprising:
  a driving unit comprising a fuel cell system and configured to drive an autonomous drone;
  a braking system connected with the driving unit, the braking system comprising:
    a compressor configured to discharge compressed fluid, wherein the driving unit is configured to apply an electric driving force to the compressor; and
    a braking unit;
  a bypass valve disposed at a discharge end of the compressor, wherein the bypass valve is configured to control a supply of the compressed fluid to the fuel cell system only according to a first configuration, to the braking unit only according to a second configuration and to both the fuel cell system and the braking unit according to a third configuration; and
  a controller configured to determine a braking complement condition of a vehicle and to drive the braking system based on the braking complement condition.

13. The apparatus according to claim 12, wherein the driving unit further comprises:
  a regenerative braking system configured to convert a braking force of the autonomous drone into electric energy, and
  a high-voltage battery configured to be charged from the fuel cell system or the regenerative braking system, and wherein the fuel cell system is configured to provide a driving force to the autonomous drone.

14. The apparatus according to claim 12, wherein the fuel cell system further comprises an exhaust system.

15. The apparatus according to claim 14, wherein the fuel cell system further comprises:

a regulator disposed at a discharge end of the bypass valve, a cooler connected to a discharge end of the regulator, and a fuel cell stack connected between a discharge end of the cooler and the exhaust system.

16. The apparatus according to claim 12, further comprising an air tank connected to the bypass valve, wherein the air tank comprises:

a braking air tank connected to the braking unit configured to assist a braking force of the vehicle, and a suspension air tank connected to an air suspension of the vehicle.

* * * * *